(12) United States Patent
Plattenburg et al.

(10) Patent No.: US 10,713,708 B2
(45) Date of Patent: Jul. 14, 2020

(54) ON-DEMAND ROUTING UPON LOCATION DETECTION

(71) Applicant: NCR Corporation, Duluth, GA (US)

(72) Inventors: Brian Plattenburg, Atlanta, GA (US); Matthew Phillip Kamp, Cumming, GA (US)

(73) Assignee: NCR Corporation, Atlanta, GA (US)

( * ) Notice: Subject to any disclaimer, the term of this patent is extended or adjusted under 35 U.S.C. 154(b) by 1198 days.

(21) Appl. No.: 14/529,498

(22) Filed: Oct. 31, 2014

(65) Prior Publication Data

US 2016/0125514 A1    May 5, 2016

(51) Int. Cl.
*G06Q 30/06* (2012.01)
*H04W 4/029* (2018.01)

(52) U.S. Cl.
CPC ........ *G06Q 30/0639* (2013.01); *H04W 4/029* (2018.02)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 2014/0279238 A1* | 9/2014 | Jones | G06Q 30/0617 |
| | | | 705/26.43 |
| 2014/0379529 A1* | 12/2014 | Agasti | G06Q 30/0635 |
| | | | 705/26.81 |
| 2015/0181384 A1* | 6/2015 | Mayor | H04W 24/02 |
| | | | 455/456.1 |

OTHER PUBLICATIONS

Improving Inventory Efficiencies With RFID, Retail Touch Points, Alicia Esposito, available at: https://retailtouchpoints.com/topics/store-operations/improving-inventory-efficiencies-with-rfid Sep. 24, 2012 (Year: 2012).*

* cited by examiner

*Primary Examiner* — Ming Shui
(74) *Attorney, Agent, or Firm* — Schwegman, Lundberg & Woessner

(57) ABSTRACT

Various embodiments herein each include at least one of systems, devices, methods, and software for on-demand routing upon location detection. One such embodiment is in the form of a method. This embodiment includes detecting a mobile device is present at a facility and retrieving available order data associated with an account registered with the mobile device. When order data is available and retrieved, the method may then output the order data to facilitate fulfillment of one or more orders included in the retrieved data.

9 Claims, 4 Drawing Sheets

US 10,713,708 B2

ON-DEMAND ROUTING UPON LOCATION DETECTION

BACKGROUND INFORMATION

In modern retail environments, such as stores and restaurants, it has become common that customers order items for delivery when they arrive at a preselected location. For example, a customer may order food or one or more items via a phone call or on a website or mobile device app, select a specific retail outlet where the food or one or more items will be picked up, and then arrive at the specific retail outlet to pick up the food or one or more items. While this provides certain benefits to consumers and retail outlets, retailers continue to strive to provide customers greater flexibility and better experiences.

SUMMARY

Various embodiments herein each include at least one of systems, devices, methods, and software for on-demand routing upon location detection.

One such embodiment is in the form of a method. This embodiment includes detecting a mobile device is present at a facility and retrieving available order data associated with an account registered with the mobile device. When order data is available and retrieved, the method may then output the order data to facilitate fulfillment of one or more orders included in the retrieved data.

Another method embodiment includes receiving, via a network, order data associated with an account and detecting presence of a mobile device at a retail outlet. This method further includes identifying an association of the mobile device to the account and retrieving the order data associated with the account. This method also includes outputting the order data to facilitate fulfillment of an order of the order data.

Other embodiments include systems. A system in one such embodiment includes at least one network interface device, at least one processor, at least one memory, and at least one output device, such as a monitor or printer. The at least one memory device stores an instruction set that is executable by the at least one processor to perform data processing activities. The data processing activities include receiving, via the at least one network interface device, order data associated with at least one account and detecting a mobile device present at a retail outlet and associating the mobile device with an account associated with the order data. The data processing activities further include outputting at least a portion of the order data via the at least one output device to facilitate fulfillment of an order of the order data.

DETAILED DESCRIPTION

Figure 1:
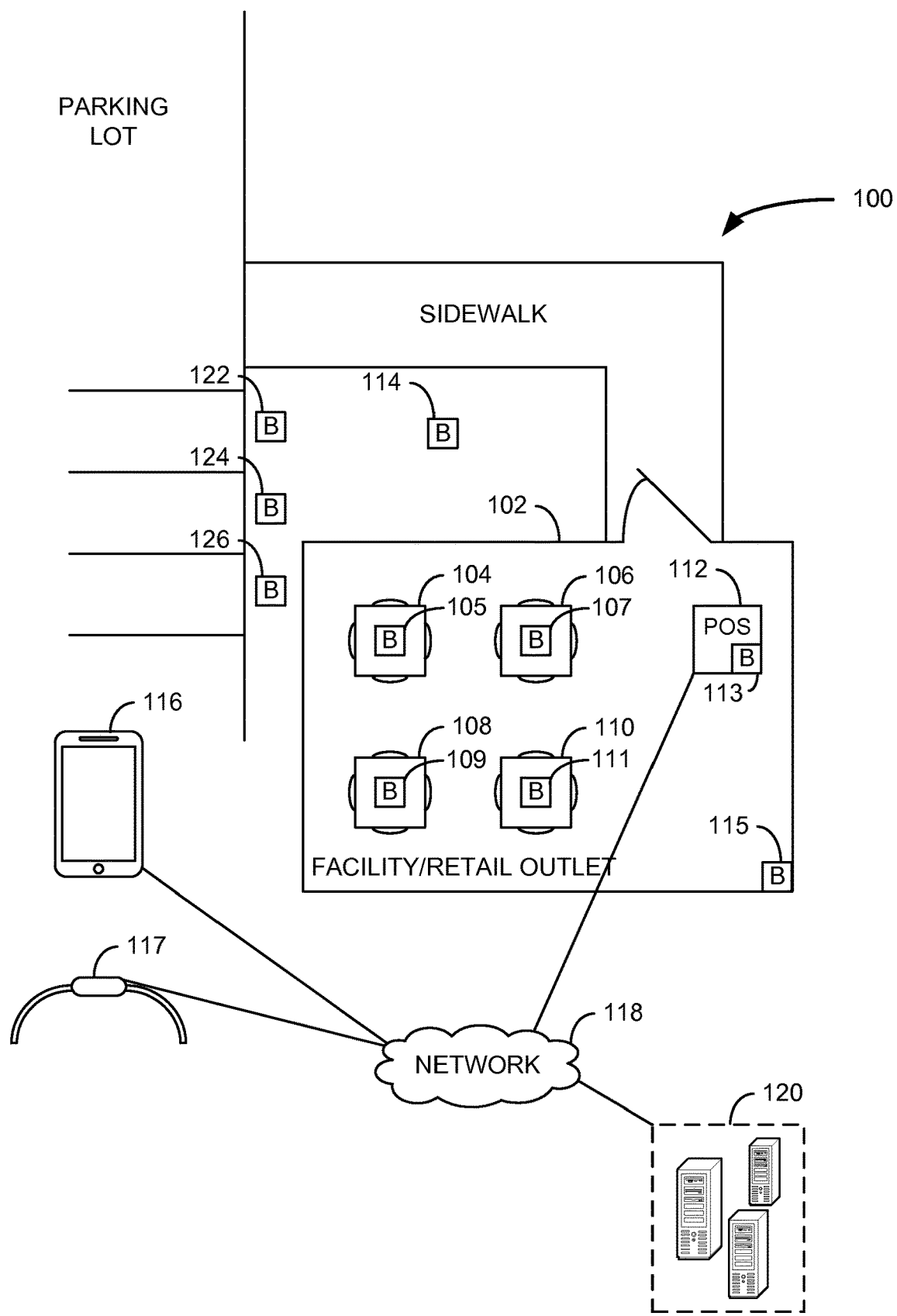
FIG. 1 is a logical block diagram of a system, according to an example embodiment.

Various embodiments herein each include at least one of systems, devices, methods, and software for on-demand routing upon location detection. Such embodiments allow customers to place orders for items, such as food and items offered for sale in stores, without designating a retail outlet where the pick up will occur. In some embodiments, a customer may even designate a facility where the pick up will occur and for whatever reason, the customer arrives at a different facility for the pick up. These embodiments operate to detect when and where a customer arrives for the pick up and routes the order to the facility where the customer arrives so that the order may be fulfilled. This may include sending a food order to a kitchen for the food to be prepared. This may also, or alternatively, include sending an item order to personnel that will pull the ordered items from inventory for delivery to the customer. In these and other embodiments, in addition to detecting the customer presence at the facility, the customer's location within the facility may be identified where the delivery is to occur, such as a certain point of sale (POS) terminal, a restaurant table or pick up window, a drive-thru location, and the like.

Some such embodiments are enabled by one or more beacon devices deployed in and about a facility. Signals broadcast by beacon devices are received by customer mobile devices and are utilized to detect a facility where the customer carrying the mobile device is located. The location data along with customer identifying data, such as an account identifier, are then utilized to associate the mobile device to a yet unfulfilled order. Data of an unfulfilled order may then trigger a process in the facility that results in presentment of ordered items to the customer. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is illustrated as deployed with regard to a facility 102, such as a restaurant, although other embodiments may be deployed to other facility types, such as stores, concession stands, and other retail outlets. The system 100 operates to associate a customer account maintained in a backend computing system 120 with a customer carrying a mobile device 116, 117 having an app of an operator of the facility 102 or other entity providing app and customer services to an operator of the facility 102.

In an example embodiment, a customer carrying a mobile device 116, 117, such as a smartphone, smartwatch, or tablet, enters the facility 102. The customer mobile device 116, 117 typically includes a mobile device app that executes thereon that allows the customer to perform various actions, such as one or more of creating an account, adding and modifying payment account information, viewing and selecting items offered for sale at the facility 102, and to create an order therefore. Some embodiments of the mobile device 116, 117 app may perform additional actions such as viewing receipts of visits or interactions in the facility 102 or other facilities or access points (e.g., websites, kiosks, etc.), viewing a current bill, viewing a facility 102 map, viewing data of appointments and reservations, and the like. The mobile device 116, 117 app, in some embodiments, receives data received by a transceiver device present on the mobile device 116, 117, such as one or both of a BLUETOOTH® device and a WI-FI® device. In some embodiments, the data may also or alternatively be received via a GPS device of the mobile device 116, 117. An example of data that may be received by the mobile device 116, 117 app is data from one or more beacon devices 105, 107, 109, 111, 113, 114, 115, 122, 124, 126 deployed in and around the facility 102. The data from the one or more beacon devices 105, 107, 109, 111, 113, 114, 115, 122, 124, 126 typically includes identifiers of the respective beacon devices that enable the mobile device 116, 117 app or a backend system 120 service to determine a location of the mobile device. The mobile device 116, 117, and the app thereon, may receive data from one of the beacon devices 105, 107, 109, 111, 113, 114, 115, 122, 124, 126 or a plurality of beacon devices 105, 107, 109, 111, 113, 114, 115, 122, 124, 126.

In an example embodiment, the beacon devices 105, 107, 109, 111, 113, 114, 115, 122, 124, 126 broadcast a radio signal encoded with identifying data that is registered in the backend system 120 with a known location, such as a point of sale (POS) terminal 112, a table 104, 106, 108, 110, or other location in the particular facility 102. The beacon device, in some embodiments, may include a radio device, such as a BLUETOOTH® beacon device. Among others, such beacon devices are available from NCR Corporation of Duluth, Ga. The positioning beacon device may also, or alternatively, include a WI-FI® Wireless Access Point (WAP) device in some embodiments. The radio signal, or signals, broadcast by the beacon device are received by the mobile device 116, 117 and the mobile device 116, 117 app or the backend system 120 may then determine a location of the mobile device 116, 117 based on one or more of the received signals. The position may also be determined based in part on a signal strength of each of the one or more signals received by the mobile device 116, 117.

In some embodiments, the mobile device 116, 117 app, upon receipt of positioning data, such as from one or more of the beacon devices 105, 107, 109, 111, 113, 114, 115, 122, 124, 126, assembles and sends a data message to the backend system 120. The data message typically includes the position data, such as one or more received beacon device identifiers, and an identifier of the customer account. The data message may be sent, via a network 118 such as the Internet, to the backend system 120 by calling a web service offered by the backend system 120 or sending a another type of data message or method call depending on the particular embodiment.

The backend system 120 may then associate the received web service or other data message or method call with a customer account based on the customer account identifier. The backend system 120 may also then determine a location of the customer based on the one or more beacon device 105, 107, 109, 111, 113, 114, 115, 122, 124, 126 identifiers. Based on the identified customer account and location, one or more data processing activities may then be identified for execution. For example, based on the identified customer account, a query of a backend system 120 database may be made to identify any open orders for which ordered items are awaiting pick up. When one or more open orders awaiting pick up are identified, each of the one or more identified orders may then be transmitted to the facility of the location to be prepared or retrieved for delivery to the customer of the particular account. In some instances, an open order may have been placed by one account holder for the benefit or delivery of another account holder, such as a gift or as one family member purchasing or order an item for pick up by another family member. In some such instances, open orders may be prepaid when the order was placed or the order may be paid for at a time of pick up. The items to be picked up may be picked up by customers at a designated location, such as a pick up window or drive thru window, or the pick up location may be a location of the customer, such as when the customer is at the POS terminal 112, a table 104, 106, 108, 110, or other location in the facility 102.

In some embodiments, a mobile device 116, 117 using customer may order items, such as food or items offered for sale, via their mobile device 116, 117 or via another device such as a computer via the network 118 such as the Internet. When the order is placed, the order is associated with an account of the customer. When the order is place, a facility where the order will be picked up may not be provided. Instead, the customer may arrive at a facility, such as a facility 102, to pick up the order. When the customer arrives at the facility 102 for pick up, an app on the customer's mobile device 116, 117 receives a signal from one of the beacon devices 105, 107, 109, 111, 113, 114, 115, 122, 124, 126 and transmits one or more beacon device identifiers and customer account identifying data to the backend system 120. The backend system 120 may then transmit data to the facility 120, such as to the POS terminal 112 or other device indicating the customer has arrived and the items they are to pick up. The order may then be fulfilled. Through such embodiments, customers may order items from virtually anywhere even when they do not know where a facility where the pick up can occur is located. One such example is where a customer may be driving on a highway and not know where the next restaurant of a chain is located. However, the customer knows what they want to order. The customer may spot a sign indicating a restaurant of the chain is at the next exit. The customer may take that exit, arrive at the restaurant, and the restaurant will automatically receive the customer's order when the mobile device 116, 117 app receives a signal from one or more beacon devices 105, 107, 109, 111, 113, 114, 115, 122, 124, 126.

Such solutions may also be integrated with other functionality. For example, if the identified location is with regard to the beacon device 114 as the customer is approaching the facility 102 entrance, a data processing activity may be identified and invoked to retrieve customer profile data and an image of the customer from a database and to transmit that data, via the network 118, to POS terminal 112 or other facility 102 computing device located inside the facility 102 near the entrance. This data may then be presented to inform the attendant to greet the customer by name when they see the person represented in the image and to inform them of the status of their order. Similarly, in many restaurants today, customers may order food for pickup with the food being delivered to their car when the park in the parking lot. Thus, the app on the customer's mobile device 116, 117 upon receipt of a signal from one or more of the beacon devices 122, 124, 126 located in designated parking spots in a parking lot, this data may be transmitted to the backend system 120. The backend system 120 may then identify and perform data processing activities with regard to the particular customer to identify an open pickup order for curbside delivery. The process may then inform personnel of the facility 102 that the customer has arrived, a listing of their ordered items, their location such as the specific parking spot, and may also provide additional details with regard to their vehicle if the vehicle is included in order or customer profile data. Facility 102 personnel may then promptly prepare their order and deliver the order curbside upon the customer's arrival.

Further details of some such embodiments are described with regard to the following methods.

Figure 2:
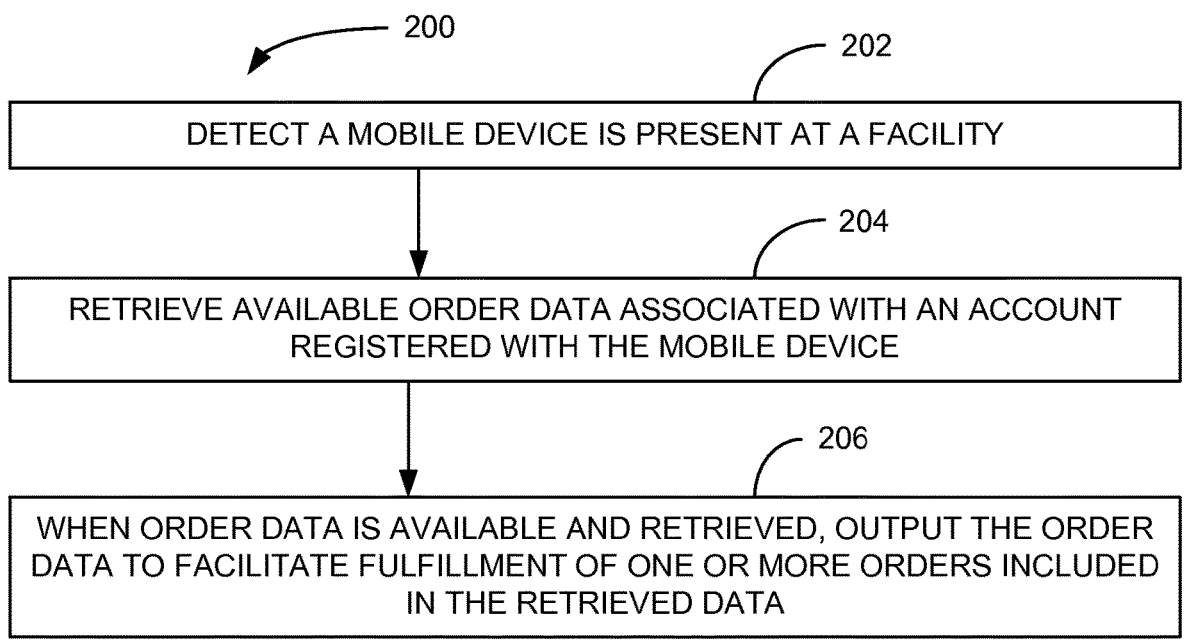
FIG. 2 is a block flow diagram of a method, according to an example embodiment.

FIG. 2 is a block flow diagram of a method 200, according to an example embodiment. The method 200 is an example of a method that may be performed in whole or in part on a backend system, such as the backend system 120 of FIG. 1.

The method 200 includes detecting 202 a mobile device is present at a facility, such as upon receipt of data from a mobile device app including a beacon device identifier of a beacon registered in configuration data in association with the facility. The method 200 further includes retrieving 204 available order data associated with an account registered with the mobile device. The account, in some embodiments, is identified based on account identifying data included in data received from the mobile device. When order data is available and retrieved, the method 200 includes outputting 206 the order data to facilitate fulfillment of one or more orders included in the retrieved data. The outputting 206 of the order data may include transmitting data to a facility management system located at the facility. The facility management system may then present the data on an output device, such as a monitor located in a stock room, kitchen, or other location. In some embodiments, the facility management system may also or instead output the data via a paper or label printer. In some of these embodiments, when the order data is output 206, the order data is output 206 with an order identifier that is also transmitted to the mobile device for presentation to the account holder. The order identifier in such embodiments may be an identifier, such as a number, that will be called out when the order is ready for pickup.

In some such embodiments of the method 200, detecting 202 the mobile device is present at the facility includes receiving, via a network from an app that executes on the mobile device, an account identifier and at least one beacon device identifier. The method 200 may then query a database of beacon identifier to obtain a facility identifier. In such embodiments of the method 200, retrieving 204 available order data associated with an account registered with the mobile device includes retrieving order data from the database based at least in part on the account identifier. The retrieved order data typically includes at least one item ordered by an account holder with an indication the at least one item is to be provided to the account holder of the account identifier.

Figure 3:
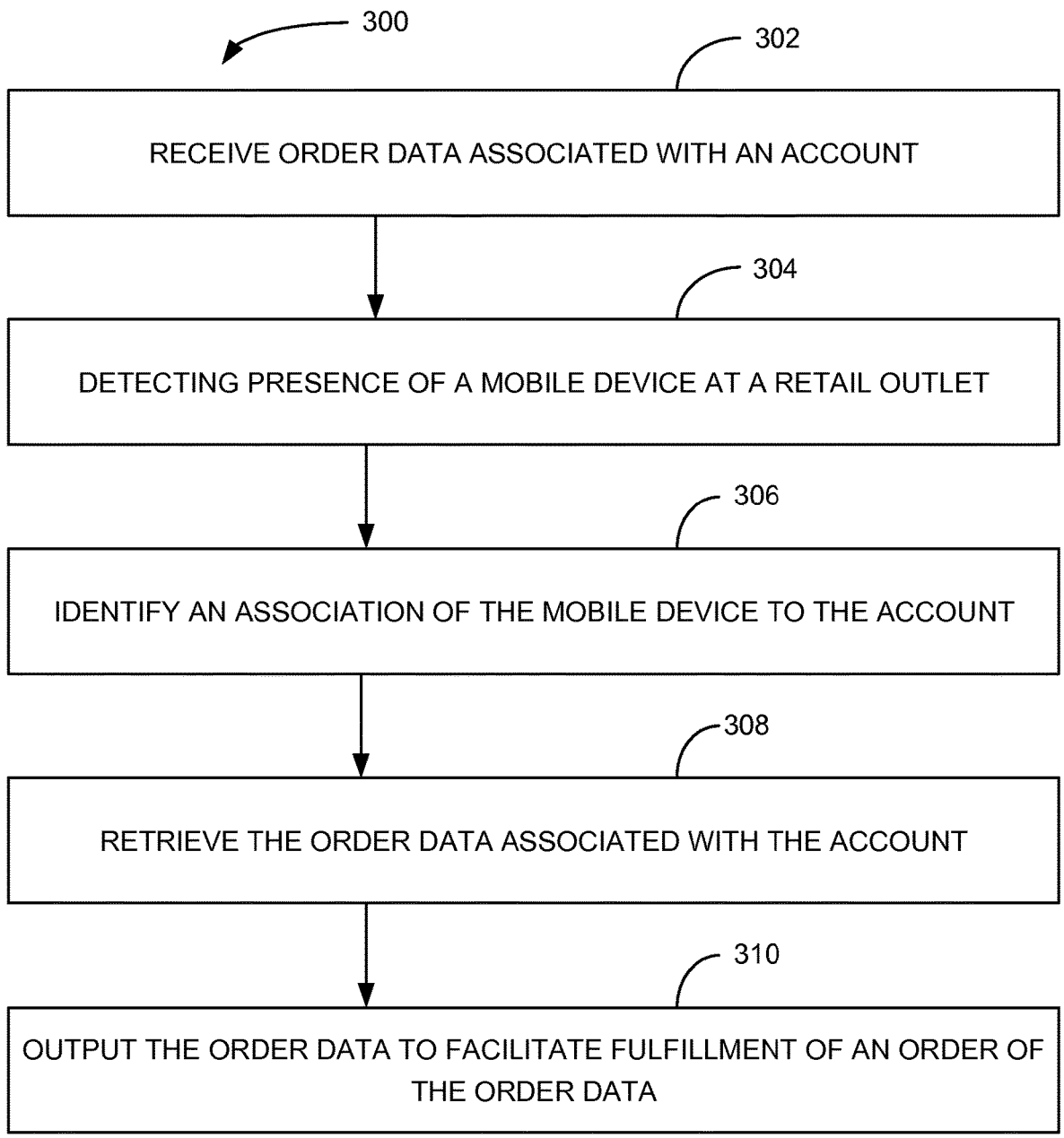
FIG. 3 is a block flow diagram of a method, according to an example embodiment.

FIG. 3 is a block flow diagram of a method, according to an example embodiment. The method 300 is another example of a method that may be performed in whole or in part on a backend system, such as the backend system 120 of FIG. 1. Note however that the backend system may be located, in whole or in part, at a facility and be specific to that facility in some embodiments.

The method 300 includes receiving 302, via a network, order data associated with an account and detecting 304 presence of a mobile device at a retail outlet. The method 300 further includes identifying 306 an association of the mobile device to the account and retrieving 308 the order data associated with the account. The method 300 may then output 310 the order data to facilitate fulfillment of an order of the order data.

In some embodiments of the method 300, detecting 304 the presence of the mobile device at the retail outlet includes receiving, via the network from the mobile device, an identifier of at least one beacon device deployed at the retail outlet. The method 300 in such embodiments then queries a database of beacon identifiers to obtain a retail outlet identifier. In some of these embodiments, the beacon device is a radio beacon device that operates to broadcast a radio signal encoded with at least an identifier of the beacon device that is registered in the database of beacon identifiers in association with an identifier of the retail outlet.

In another embodiment, identifying 306 the association of the mobile device to the account includes receiving, via the network from the mobile device, an account identifier of the account from the mobile device. In some of these embodiments, retrieving 308 the order data associated with the account includes retrieving the order data from a database within which the received order data is stored. The order data may be retrieved based at least in part on the received account identifier. Further, outputting 310 the order data to facilitate fulfillment of the order of the order data may include transmitting the order data via the network to a device located at the retail outlet to present the order data to instruct retail outlet personnel to fulfill the order. Transmitting the order data to the device located at the retail outlet may include transmitting a customer identifier associated with the account to aid in customer identification.

In some further embodiments of the method 300, the received 302 order data includes an identifier of a second account to which at least one item of the order is to be provided. Further, the identifying 306 of the association of the mobile device to the account includes identifying an association of a second mobile device to the second account and the retrieving 308 of the order data associated with the account includes retrieving the order data associated with the second account. Such embodiments allow one customer account holder to order items to be picked up by another customer account holder. This can be in instances of gifting, such as where one person may purchase a cup of coffee or other item for another person. Or when one family member is away from home and will be passing a favorite restaurant of another family member, the another family member can order food from the favorite restaurant for pick up by the family member away from home.

Figure 4:
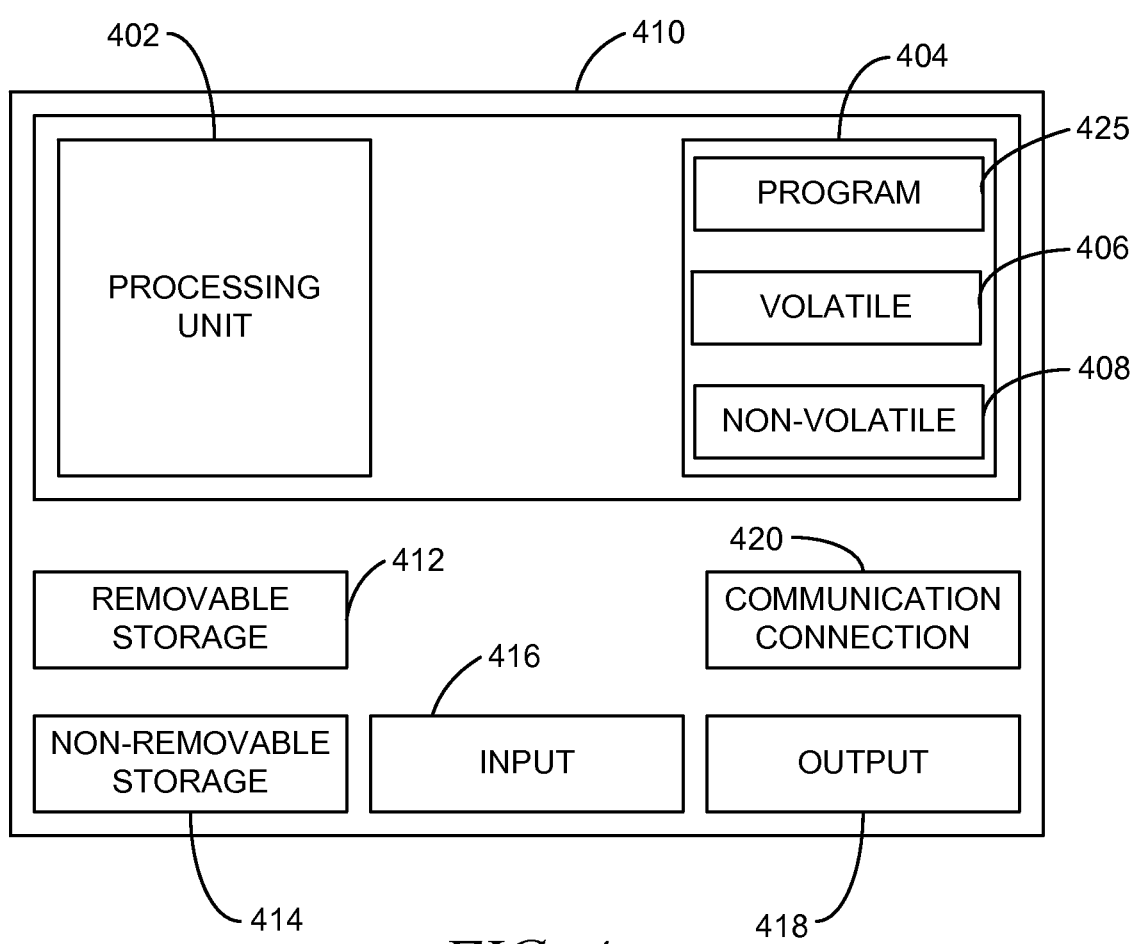
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

Another system embodiment includes at least one network interface device, at least one processor, at least one memory, and at least one output device, such as a monitor or printer. The at least one memory device stores an instruction set that is executable by the at least one processor to perform data processing activities. The data processing activities include receiving, via the at least one network interface device, order data associated with at least one account and detecting a mobile device present at a retail outlet and associating the mobile device with an account associated with the order data. The data processing activities further include outputting at least a portion of the order data via the at least one output device to facilitate fulfillment of an order of the order data.

In some embodiments, the system further includes a transceiver device that operates as a radio signal beacon to broadcast an identifier registered in the system to the retail outlet. In such embodiments, detecting the mobile device is present at the retail outlet includes receiving, via the at least one network interface device from the mobile device, an identifier of at least one transceiver device deployed at the retail outlet. The data processing activities in such embodiments may further include querying a database of transceiver device identifiers to obtain a retail outlet identifier.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method performed through executions of instructions by at least one processor to perform data processing activities comprising:
    transmitting a radio signal from a beacon device present at a facility with a beacon identifier encoded in the radio signal;
    detecting a mobile device is present at a facility by:
    receiving, via a network from an app that executes on the mobile device, an account identifier and at least one radio beacon device identifier including the beacon device identifier transmitted by the radio beacon device; and
    querying a database of beacon identifiers with the at least one beacon identifier to retrieve a facility identifier;
    retrieving available order data associated with an account registered with the mobile device based on the account identifier, the order data not including a location where pick up will be made, the retrieved order data including at least one item ordered by an account holder over the network and stored at a network location accessible by a system performing the method, the retrieved data further including a data indication the at least one item is to be provided to the account holder of the account identifier when the account holder is determined to be at the facility based on the detecting; and
    when order data is available and retrieved, outputting the order data from at least one of a display device, a printer, and as an electronic message to at least one computing device that presents messages to facility staff located at the facility to facilitate fulfillment of one or more orders included in the retrieved data, the output order data identifying one or more products to be presented to a customer in possession of the mobile device.

2. The method of claim 1, wherein outputting the order data includes outputting an order identifier that has also been transmitted to an app that executes on the mobile device.

3. The method of claim 1, the data processing activities further comprise receiving order data at a time other than when the mobile device is present at the facility.

4. The method of claim 1, wherein outputting the order data includes transmitting a customer identifier associated with the account to aid in customer identification.

5. The method of claim 1, wherein retrieving the order data includes identifying an open order awaiting pickup.

6. A system comprising:
- at least one network interface device;
- a transceiver device that operates as a radio signal beacon to broadcast an identifier registered in the system to a retail outlet;
- at least one processor;
- at least one memory;
- at least one output device; and
- an instruction set, stored in memory and executable by the at least one processor to perform data processing activities, the data processing activities comprising:
  - receiving, via the at least one network interface device, order data associated with at least one account but not including data designating a location where a subject of the order data is to be picked up;
  - detecting a mobile device present at the retail outlet and associating the mobile device with an account associated with the order data, the detecting of the mobile device presence including:
    - receiving, via the at least one network interface device from the mobile device, an identifier of at least one transceiver device deployed at the retail outlet; and
    - querying a database of transceiver device identifiers to obtain a retail outlet identifier;
  - outputting at least a portion of the order data via the at least one output device to facilitate fulfillment of an order of the order data at the facility.

7. The system of claim 6, wherein the at least one output device includes a monitor.

8. The system of claim 6, wherein the order data is received at a time other than when the mobile device presence is at the retail outlet is detected.

9. The system of claim 6, wherein the mobile device detected as present is a mobile device associated with an account other than an account to be billed for charges that initiated the order data.

* * * * *